(No Model.)

G. W. MARTIN.
HORSESHOE CALK.

No. 279,408. Patented June 12, 1883.

Witnesses:

Inventor
George W. Martin
Attorney.

UNITED STATES PATENT OFFICE.

GEORGE W. MARTIN, OF COVINGTON, INDIANA, ASSIGNOR OF ONE-HALF TO JOHN B. MARTIN, OF SAME PLACE.

HORSESHOE-CALK.

SPECIFICATION forming part of Letters Patent No. 279,408, dated June 12, 1883.

Application filed April 26, 1883. (No model.)

*To all whom it may concern:*

Be it known that I, GEORGE W. MARTIN, a citizen of the United States of America, residing at Covington, in the county of Fountain and State of Indiana, have invented certain new and useful Improvements in Horseshoe-Calks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in removable calks for horseshoes; and it consists in providing a removable calk with a central perforation and inwardly-extending bifurcated flange, by means of which the same can be readily attached to and detached from a horseshoe by means of a screw-threaded bolt having a hooked end, as will be hereinafter more fully set forth, and pointed out in the claim.

Figure 1:
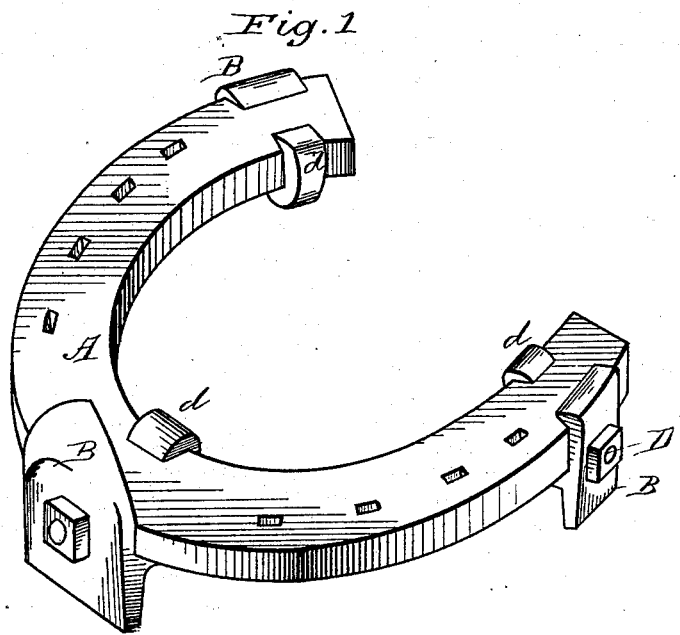
Figure 2:
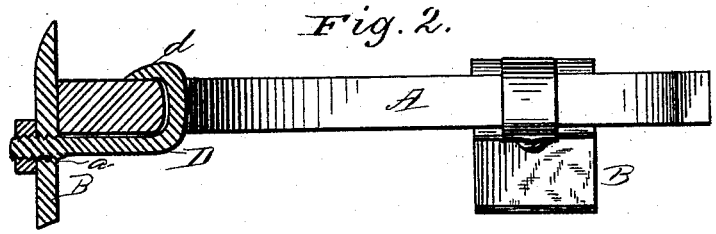
Figure 3:
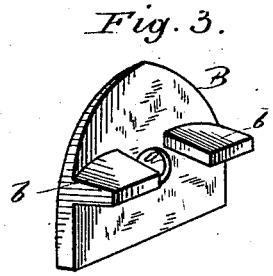
Figure 4:
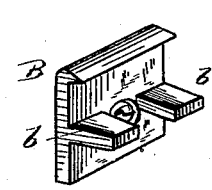

In the annexed drawings, which illustrate my invention, Figure 1 is a perspective view of a horseshoe having my invention applied thereto. Fig. 2 is a sectional view. Fig. 3 is a perspective view of a toe-calk constructed in accordance with my invention, and Fig. 4 is a perspective view of the heel-calk.

In the annexed drawings, A represents a horseshoe of ordinary construction, to which my invention is applied, B being the calk, which consists of a single piece of malleable iron or steel, which is provided near its center with a perforation, $a$, and on its inner under side with inward-projecting flanges to allow a passage-way for the bolt, as will be hereinafter described. The flanges $b\,b$ extend under the shoe sufficiently to form a bearing-surface upon the under surface of the same. The upper part of this calk B may extend upwardly, as shown in Fig. 3, in which case it may be inclined slightly inward, so as to grasp the shoe and the toe of the hoof of the horse. The heel-plate, as shown in Fig. 4, may have an overlapping flange, which is sharpened on its inner edge and projects over the upper portion of the shoe and under the hoof.

The construction of these calks, which will be fully understood from the foregoing description and the drawings, permits of their being secured to the horseshoe by a bolt, D, which has its end $d$ bent upwardly so as to extend around and over the horseshoe and under the hoof, the outer end of this bolt being provided with a nut, by means of which the parts can be readily detached or firmly secured in place.

It will be noticed that the flanges of the calks which lie next to the horseshoe are bifurcated, or have the central portion thereof cut away. This allows a central passage for the body of the bolt or clip, which is flattened and will lie upon the bottom of the horseshoe.

It is evident that a horseshoe-calk constructed as hereinbefore described may be readily attached and detached from the horseshoe.

Having thus described my invention, what I claim as new, and desire to secure by Letters Patent, is—

A horseshoe-calk, B, having central perforations and inwardly-projecting flanges $b\,b$, in combination with the bolt D, having its inner end curved upward so as to fit over the shoe, and its outer end screw-threaded and provided with a nut, substantially as shown and for the purpose set forth.

In testimony whereof I affix my signature in presence of two witnesses.

GEORGE W. MARTIN.

Witnesses:
JOSEPH A. MORRIS,
J. B. WILLIAMS.